United States Patent [19]
Christensen et al.

[11] Patent Number: 5,923,502
[45] Date of Patent: Jul. 13, 1999

[54] MAGNETO-RESISTIVE HEAD INCLUDING A SELECTIVELY PLACED LOW-RELUCTANCE PATH BETWEEN SHIELDS

[75] Inventors: Thomas Charles Christensen, Johnston, Iowa; Jodie Ann Christner; Earl Albert Cunningham, both of Rochester, Minn.; Jay Michael Mosbrucker, Morgan Hill, Calif.

[73] Assignee: International Business Machines Corporation, Armonk, N.Y.

[21] Appl. No.: 08/576,496

[22] Filed: Dec. 21, 1995

[51] Int. Cl.$^6$ ................................................. G11B 5/008
[52] U.S. Cl. ........................................ 360/113; 338/32 R
[58] Field of Search .................... 360/113; 338/32 R; 324/252

[56] References Cited

U.S. PATENT DOCUMENTS

| | | | |
|---|---|---|---|
| 3,881,190 | 4/1975 | Brock et al. | 360/113 |
| 3,940,797 | 2/1976 | Brock et al. | 360/113 |
| 3,975,772 | 8/1976 | Lin | 360/113 |
| 4,071,868 | 1/1978 | Kaminaka et al. | 360/113 |
| 4,418,366 | 11/1983 | Moriya | 360/75 |
| 4,420,778 | 12/1983 | Sakamoto | 360/77.16 |
| 4,698,711 | 10/1987 | Vinal | 360/113 |
| 4,902,971 | 2/1990 | Guzik et al. | 324/212 |
| 4,935,832 | 6/1990 | Das et al. | 360/112 |
| 4,945,427 | 7/1990 | Cunningham | 360/75 |
| 4,975,781 | 12/1990 | Eggebeen | 360/77.01 |
| 4,979,051 | 12/1990 | Eggebeen | 360/21 |
| 5,075,956 | 12/1991 | Das | 29/603 |
| 5,208,715 | 5/1993 | Mowry | 360/113 |
| 5,257,149 | 10/1993 | Meyer | 360/78.14 |
| 5,323,285 | 6/1994 | Smith | 360/113 |

FOREIGN PATENT DOCUMENTS

| | | | |
|---|---|---|---|
| 0 482 642 A2 | 4/1992 | European Pat. Off. | 360/113 |
| 62-95711 | 5/1987 | Japan | 360/113 |
| 3-280208 | 12/1991 | Japan . | |
| 5-217129 | 8/1993 | Japan | 360/113 |
| 6-36238 | 2/1994 | Japan | 360/113 |
| 6-68426 | 3/1994 | Japan . | |

OTHER PUBLICATIONS

IBM Technical Disclosure Bulletin, vol. 24 N.4, Sep. 1981, pp. 1931–1932.

*Primary Examiner*—David D. Davis
*Attorney, Agent, or Firm*—Merchant Gould Smith Edell Welter and Schmidt

[57] ABSTRACT

A magnetic head including a shielded MR element which incorporates a low reluctance path between the shields to reduce interference picked up by inductive reading of the shields. The low reluctance path is provided outside a conductive loop of material which includes the MR element and its associated leads. The low reluctance path may include a magnetic short between the two shields.

14 Claims, 9 Drawing Sheets

MAGNETO-RESISTIVE HEAD INCLUDING A SELECTIVELY PLACED LOW-RELUCTANCE PATH BETWEEN SHIELDS

BACKGROUND OF THE INVENTION

The present invention is directed to a magneto-resistive (MR) head, and more particularly, to an MR head having a selectively placed low reluctance path between shields of the MR head.

Recently, memory storage devices have employed heads including MR elements (i.e., an MR head) to read and write data from and to a magnetic media, such as a magnetic disk. A typical MR head includes a write element, formed as a regular thin film head, and a read element implemented with the MR element. This type of MR head further includes shielding around the MR element to isolate the MR element from extraneous magnetic fields, to narrow the read pulse detected by the MR element, and to divert magnetic flux from the write head away from the MR element to prevent the MR element from operating unreliably.

In certain conventional memory storage devices utilizing a shielded MR head, an undesirable interference phenomenon has been identified in signals read from a magnetic media disposed in the memory storage device using the MR head. The interference phenomenon becomes even more pronounced as the operating frequency of the storage device is increased. In many instances, the interference is sufficient to adversely affect performance of the storage device. It is therefore desirable to reduce, to the extent possible, such interference in the signal picked up by the MR head.

SUMMARY OF THE INVENTION

Generally, the present invention provides a magneto-resistive head having improved shielding characteristics. In one particular embodiment, the present invention is implemented in the form of a transducer for reading information from a medium. The transducer includes a first shield, a second shield and a magneto-resistive (MR) element disposed in a gap between the first shield and the second shield. The MR element is respectively connected to first and second leads, which collectively form an effective loop of conductive material. A low reluctance flux path coupling the first shield to the second shield is disposed outside of the effective loop. The transducer may be incorporated into a memory storage device.

The above summary of the present invention is not intended to present each embodiment or every aspect of the present invention. Rather, the invention will be understood by reference to the figures and the associated description which follow.

BRIEF DESCRIPTION OF THE DRAWINGS

The invention may be more completely understood in consideration of the following detailed description of various embodiments of the invention in connection with the accompanying drawings, in which.

Figure 1:
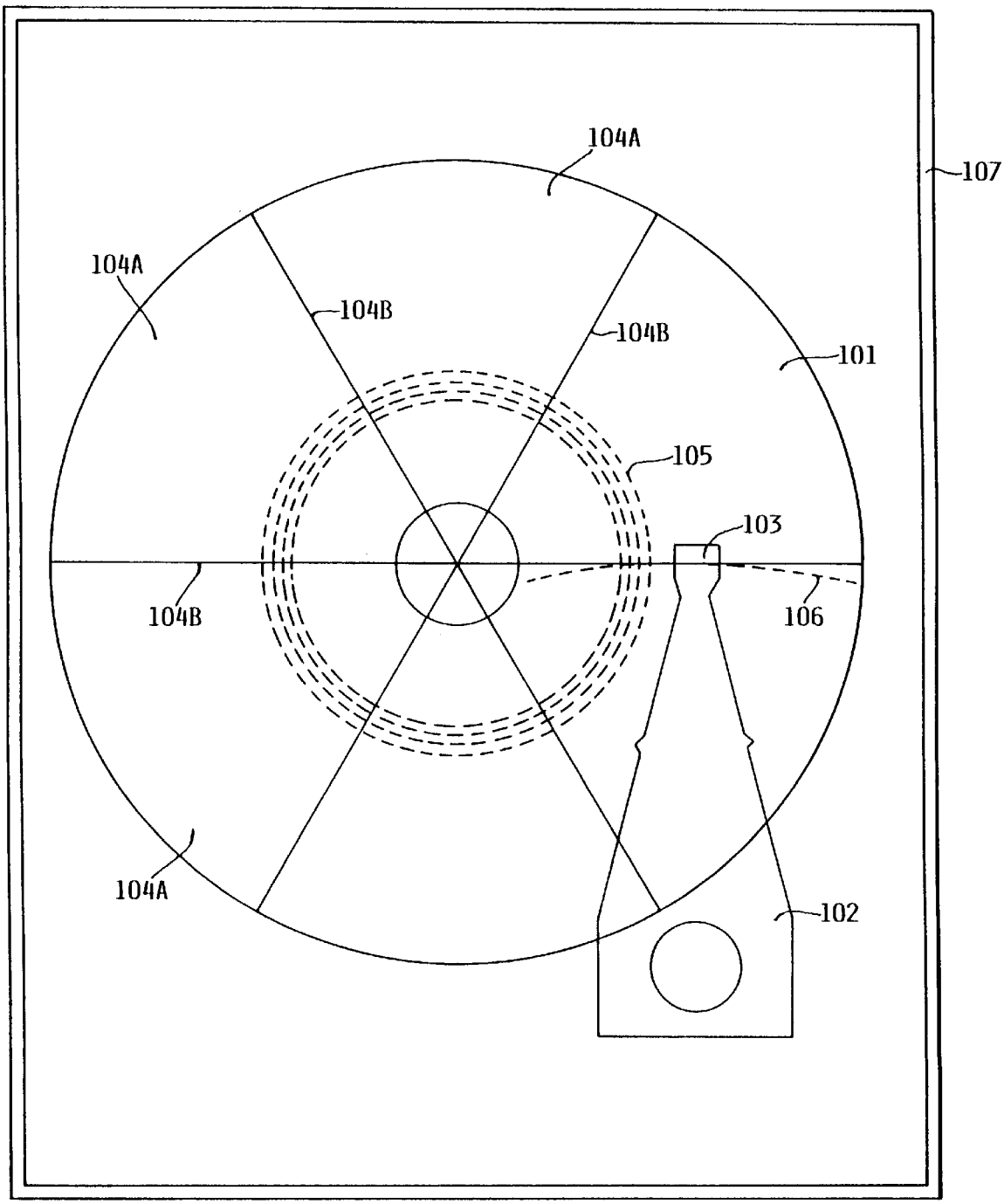
FIG. 1 illustrates a portion of a conventional disk drive apparatus.

While the invention is amenable to various modifications and alterative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In FIG. 1, components of a disk storage device are illustrated for purposes of describing the various embodiments of the invention. It is noted, however, that the invention as understood from the various embodiments described below could be implemented in any memory storage device using a shielded MR head which picks up inductive interference from its shield. For example, the invention may be provided in a multiple-track tape drive using an MR read head and having servo transitions aligned across the tracks.

In FIG. 1, a magnetic disk 101 and rotary actuator 102 are illustrated. The disk 101 and actuator 102 are mounted in a housing 107 along with other standard elements of a disk drive (not shown). The rotary actuator 102 is rotated by a voice coil motor (not shown) to position the MR head 103 over tracks 105 formed on the disk to write and read information to and from the disk 101. The disk 101 may be used to store data such as computer data, video data, audio data, and the like. The tracks 105 extend around the disk 101 in a concentric fashion. The tracks 105 may be formed as a number of concentric circles or as one or more continuous concentric spiral tracks.

As described above, the rotary actuator 102 moves the MR head 103 to a desired track location on the disk 101 to write and/or read information to and from the track. The MR head 103 moves in a generally radial direction across the surface of the disk 101 between the inner and outer diameter of the disk 101. Due to the rotary motion of the actuator 102, the actual movement of the head 103 follows an arc 106.

Memory storage devices typically use servo information, often times embedded within the storage medium, to position the read and/or write heads over a desired track. In a disk drive, for example, the read/write head reads a servo pattern contained in a servo field to determine the radial and circumferential position of the read/write head relative to the disk. Extremely accurate servo control is particularly important when disks having high track densities are used. A typical disk drive, for example, may employ a disk 101 having in excess of 2000 tracks per inch (TPI) requiring extremely precise control to position the head over a desired track location.

As illustrated in FIG. 1, a disk storage device typically includes a number of servo sectors 104A. At the beginning of each servo sector 104A, a servo pattern 104B (e.g., a sector identification pattern) is provided which contains servo information. The servo patterns 104B are typically formed on the disk 101 at equally spaced intervals around the disk 101 and along the direction of the tracks 105. The servo patterns 104B are generally formed to be substantially continuous in a radial direction from the inner to outer diameter of the disk 101 (or over a group of tracks on the disk) so as to be readable by the head 103 at any position along the arc 106. In addition to servo patterns 104B, other servo patterns are also typically provided on the disk 101. For example, Gray code patterns are typically formed on the disk 101. Gray codes extend in a generally radial direction across a number of tracks 105. Like other servo patterns, the Gray codes are continuous in a radial direction over the tracks which they encompass, and are typically made up of a number of phase aligned transitions.

Figure 2:
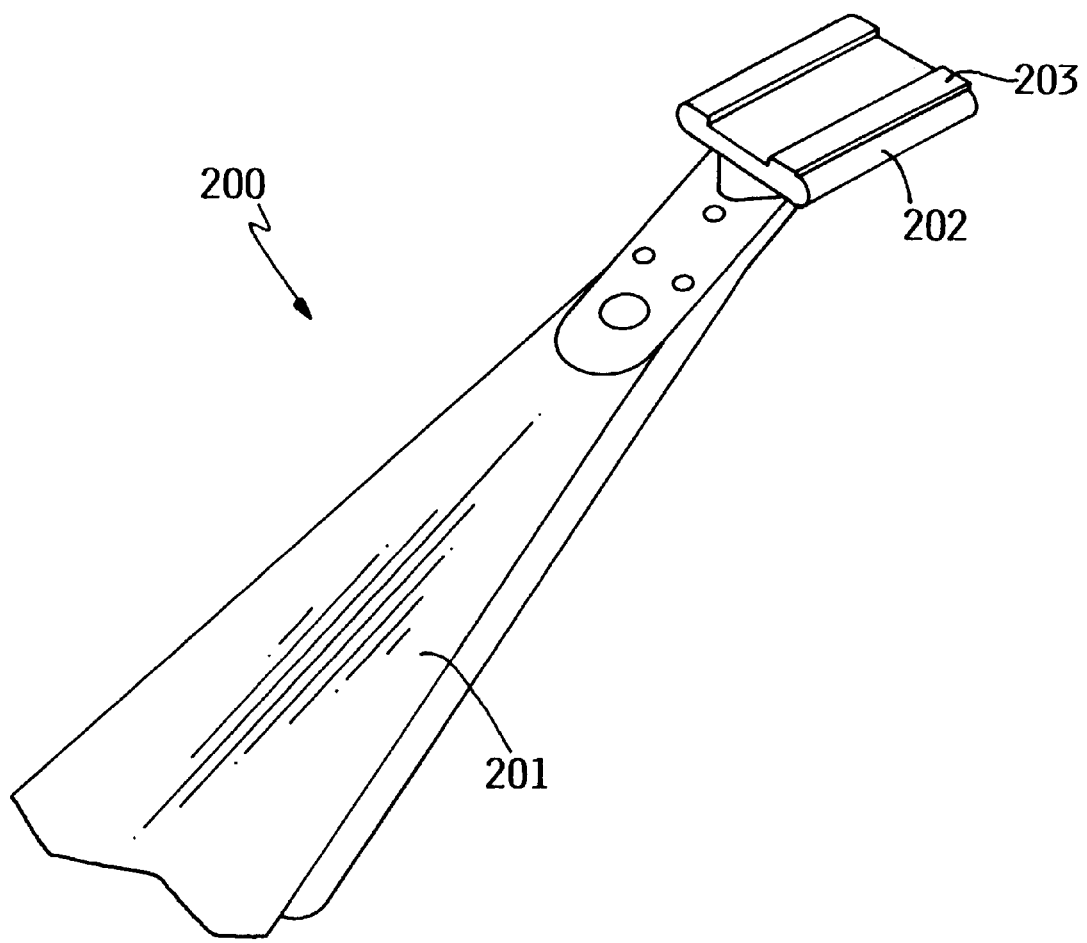
FIG. 2 illustrates a conventional head suspension assembly.

In FIG. 2, a typical head suspension assembly 200 is illustrated. The head suspension assembly 200 includes a flexure arm 201 which carries a magnetic head assembly 202. Magnetic head assembly 202 includes a slider 203 having aerodynamic properties sufficient to allow the head assembly 202 to fly over the surface of a storage disk 101 (FIG. 1). Flexure arm 201 is typically spring loaded and opposes the aerodynamic lift provided by the slider 203 to maintain the head assembly 202 at a desired flying height over the surface of the disk.

Figure 3:
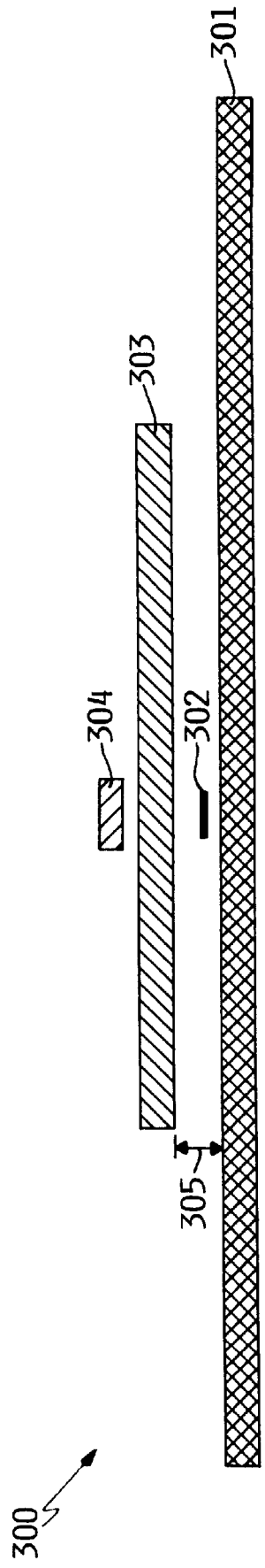
FIG. 3 illustrates functional components of a conventional merged MR head.

In order to more fully appreciate the various aspects of the present invention, a brief discussion of a conventional MR head is provided. The general layout of the principle elements in a typical merged MR head 300 is illustrated in FIG. 3. The illustration is not drawn to scale, but rather is provided to illustrate the relative orientation of the various MR head elements. The MR head includes a pair of shields 301 and 303. An MR element 302 is located between the shields 301 and 303. The MR element 302 operates as a read element of the MR head 300.

Element 303 in conjunction with element 304 form a thin film magnetic head functioning as a write element for the MR head 300. Elements 303 and 304 operate respectively as first and second magnetic poles of the thin film write element. The dual function of element 303 (i.e., acting as a first pole of the write element and as a second shield) results in the merged nature of the MR head 300. Magnetic insulation layers (not shown for purposes of clarity), such as glass, are typically formed between the various elements of the MR head 300.

By way of example, a typical MR head may be constructed having the following dimensions. The first pole/second shield 303 may have a width of approximately 100 micrometers ($\mu$m). The second pole 304 generally has a width of approximately 5 $\mu$m. The first shield 301 typically has a width in excess of 200 $\mu$m. The MR element 302 is approximately 300 angstroms (Å) thick and lies in a gap 305 provided between the first shield 301 and the first pole/second shield 303. The gap 305 is approximately 0.4 $\mu$m and is filled with an insulation material which surrounds the MR element 302.

Figure 4:
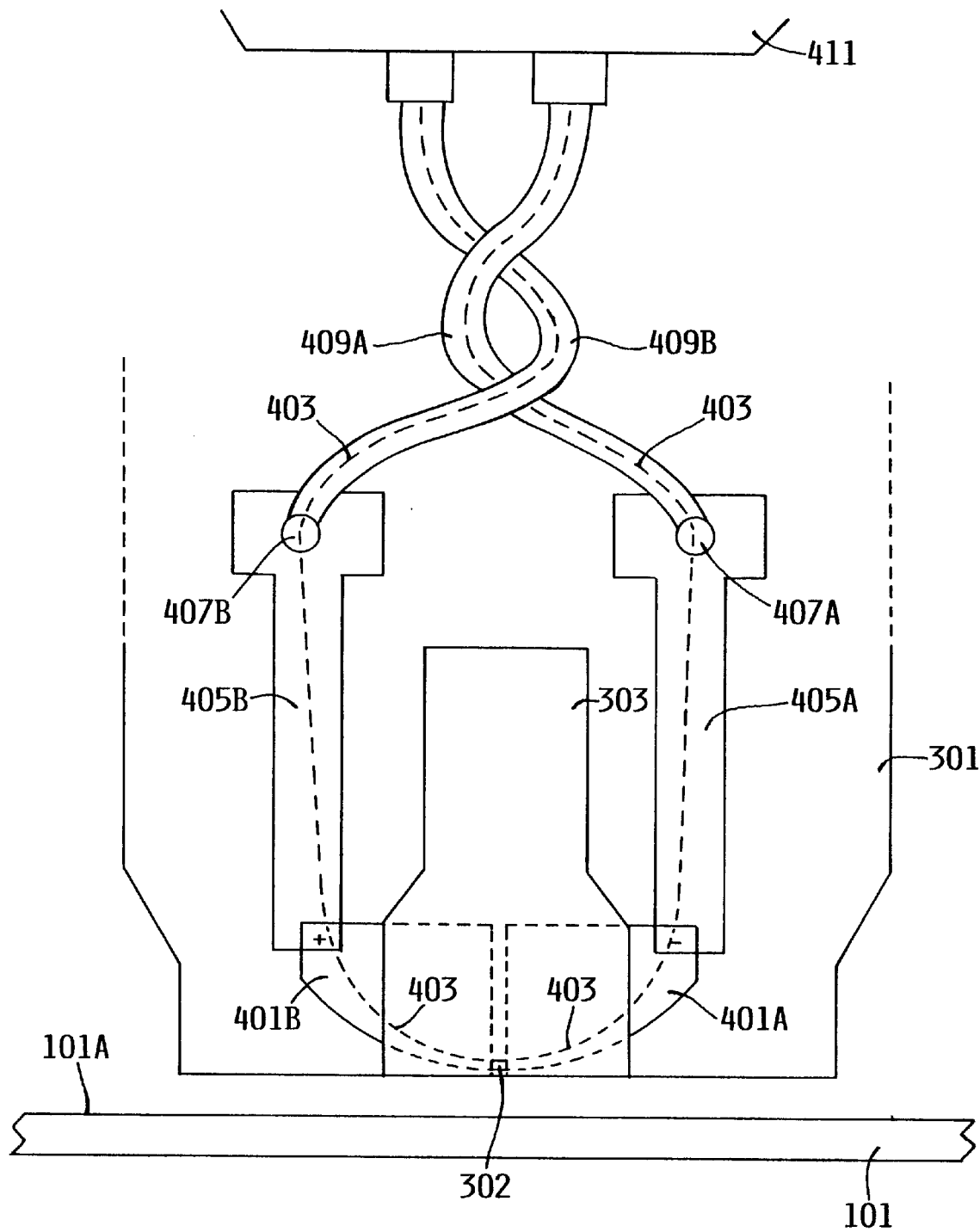
FIG. 4 illustrates another view of the conventional MR head illustrated in FIG. 3.

A side view of a typical MR head 300 is illustrated in FIG. 4. As depicted in FIG. 4, the first shield 301, MR element 302, and second shield 303 extend upward from the surface 101A of a disk 101 in respective vertical planes. The second pole 304 is removed for purposes of clarity. The planes of the elements are illustrated parallel running in the direction of the plane of the page. In the illustration, the plane of the first pole/second shield 303 is closest, followed by the MR element 302, with the first shield 301 being farthest away. Also depicted in FIG. 4 are the negative and positive MR leads 401A and 401B, respectively. These leads are formed in a plane between the first shield 301 and the first pole/second shield 303. The leads 401A and 401B are electrically coupled to the MR element 302 in a known manner and operate in the normal fashion. Connected to leads 401A and 401B, are extended leads 405A and 405B, respectively. The extended leads 405A and 405B have connection points 407A and 407B which are respectively connected to lead wires 409A and 409B which, in turn, are connected to a preamplifier module 411.

Referring to FIGS. 3 and 4, the source of the undesirable interference phenomenon found in signals read from a storage medium using a conventional merged MR head 300 of the type illustrated will be described. The construction of the MR head 300 allows for leakage of magnetic flux between the first shield 301 and the first pole/second shield 303 of the MR head 300. When the leakage between the two shields 301 and 303 is sufficient to form effective closure for magnetic flux therebetween, the shield structure forms an effective "one turn" thin-film inductive read head (referred to hereinafter as the "inductive read head"). The connection to the MR element 302 forms the "one turn" of the head. The width of the effective inductive read head is essentially the width of the second shield 303 (e.g., approximately 100 $\mu$m).

The above described effective inductive head of the conventional MR head extends across approximately 18 tracks or more, depending on the track density. The undesirable interference phenomenon is most pronounced when all of the tracks beneath the effective read head are phase aligned. In such a case, the inductive pickup may be as high as 30% of the MR servo signal at outer diameter (OD) tracks, though it is significantly smaller at inner diameter (ID) tracks.

Servo patterns often utilize phase aligned servo transitions. As a result, disk storage devices using shielded MR structures are particularly sensitive to the interference introduced into the read signal by the effective inductive read head when reading servo information from the disk. In many cases, the described interference is sufficient to introduce servo errors.

Figure 5:
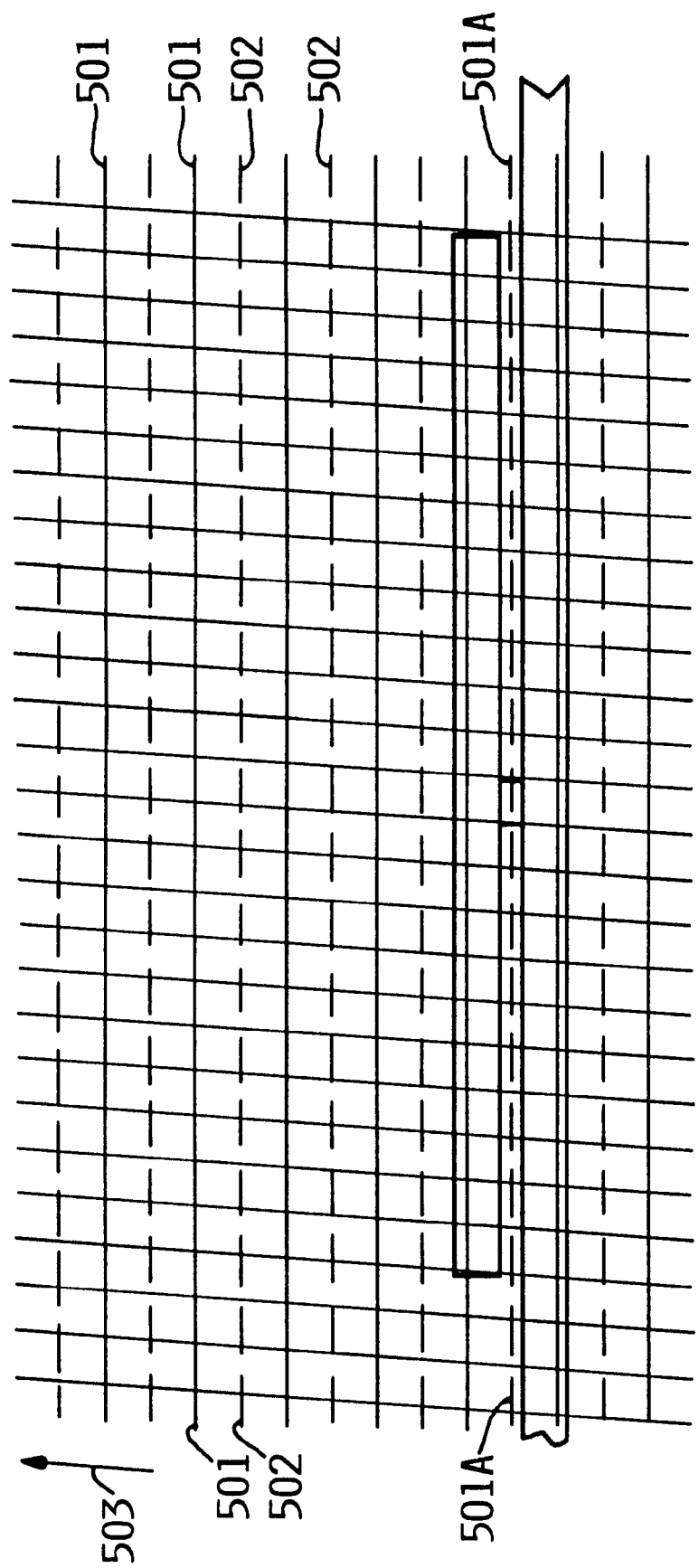
FIG. 5 illustrates a relationship between a conventional MR head and information provided on a disk.

The large interference component of a read signal typically obtained when reading servo patterns in accordance with a conventional approach results from the alignment of servo transitions within the gap of the inductive read head as depicted in FIG. 5. In FIG. 5, a number of negative 501 (solid lines) and positive 502 (dashed line) polarity transitions, alternating along the direction of the tracks illustrated by arrow 503, are depicted. As can be appreciated in FIG. 5, the gap between the shields 301 and 303 of a conventional MR head aligns along a line of polarity transitions (e.g., positive polarity transitions extending along line 501A). As a result, the effective inductive read head will read a maximum amplitude interference signal.

In a typical MR element design, the inductive read signal will be of opposite polarity to the signal generated by the MR element, which tends to reduce the total amplitude at all frequencies. However, the interference picked up by the inductive read head (interference signal) is of a slightly lower resolution than the signal read using the MR element (MR signal). As a result, the lower harmonics of the MR signal are reduced by a higher percentage than the higher harmonics of the MR signal. This effectively increases the apparent resolution of the read signal, and causes overshoots adjacent to pulses. This, in turn, causes apparent rings in the signal baseline which tend to introduce extra bits into the detection of servo sector identification (SID) patterns. When a particular track is jittered out of line, the average interference signal may cause significant holes in the baseline offset from the main MR signal pulse. This can significantly degrade the detection of SID patterns.

While the degradation of constant phased patterns as found in servo fields is the most severe, there is also a statistical degradation of the signals in the data fields. When multiple tracks of data beside the track of interest have a short period of time when they have similar patterns, the inductive interference may then add or subtract from the signal read from the track of interest. This can also cause phase shifts in the resultant signal which in turn can cause an increase in the average error rate, and in certain sectors can cause more serious increases in the error rate.

Referring to FIG. 4, it is noted that a "loop" of conductive material is formed by the MR element 302, leads 401A and 401B, extended leads 405A and 405B, lead wires 409A and 409B and the preamplifier module 411. The loop can be approximated as a line 403 through the center of the current flow. Of the total magnetic flux picked up by an inductive read head having an effective width of 100 µm (i.e., the width of the second shield 303) from the magnetic media (e.g., disk 101), as much as 80% of the flux may flow through the inside of the loop, since approximately 80% or more of the of the second shield lies over the area enclosed by the loop.

Figure 6:
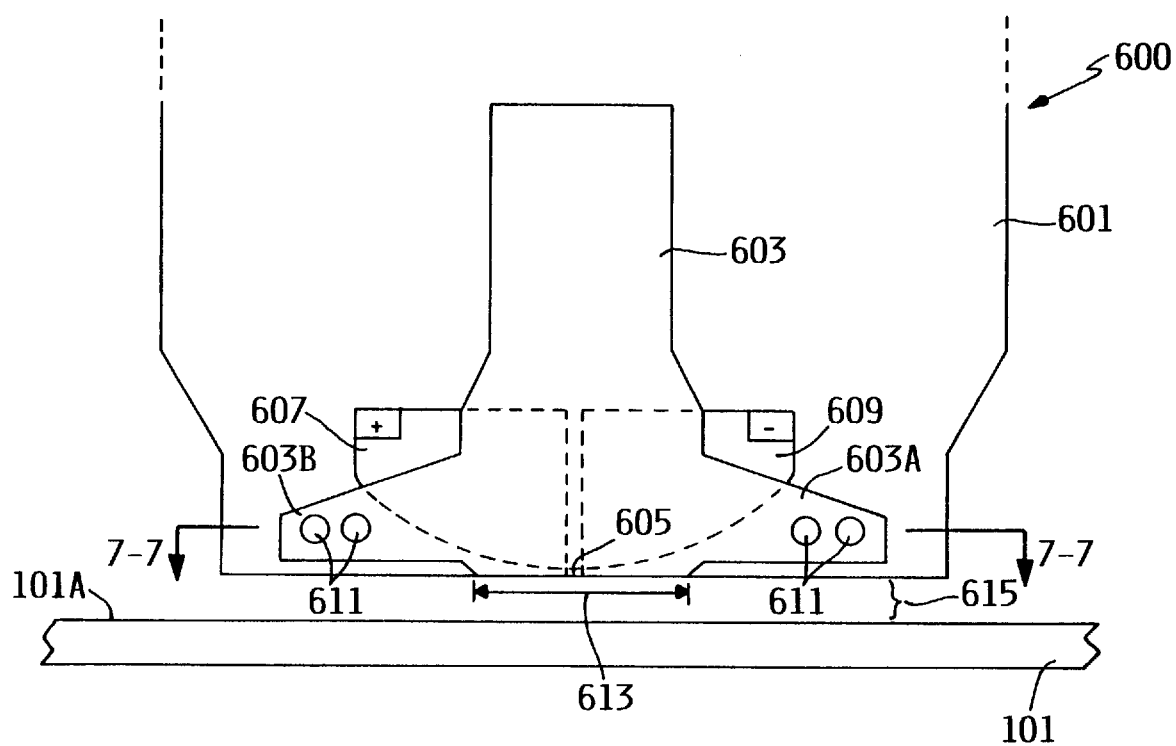
FIG. 6 illustrates an MR head in accordance with an embodiment of the invention.

An MR head in accordance with an embodiment of the present invention is illustrated in FIG. 6. The MR head 600 includes a first shield 601, a second shield 603 and an MR element 605 which is electrically coupled to a positive lead 607 and a negative lead 609. The extended leads and lead wires are not shown to enhance clarity. The MR head depicted in FIG. 6 represents a side view of the MR head 600 positioned above the surface 101A of a disk 101.

The second shield 603 has portions 603A and 603B which extend outwardly near the bottom of the second shield 603 (i.e., the portion of the shield 603 near the air bearing 615 formed between the disk surface 101A and the bottom of the head 600). In accordance with a first embodiment of the invention, a magnetic short is formed between the outwardly extending portions of the second shield 603 and the first shield 601 to provide a low reluctance path for magnetic flux picked up by the shields 601 and 603. This low reluctance path permits the magnetic flux to flow between the shields 601 and 603 in a region outside the loop of conductive material.

It is noted that in the illustrated embodiment, the width of the second shield 603 is reduced near the air bearing 615 in order to decrease the total amount of flux picked up by the shields 601 and 603 of the MR head 600. In an alternative embodiment, the width of the second shield 603 may not be reduced. In this embodiment, the magnetic short would need to provide a low reluctance flux path sufficient to substantially eliminate all of the interference, thereby eliminating the influence of the second shield 603 width. In such an embodiment, as the width of the second shield 603 is increased, the area of the second shield 603 formed outside the loop is increased thereby making more surface area available for use in producing the low reluctance flux path between the shields. In this manner, a lower overall reluctance may be achieved to provide a further decrease in the interference picked up by the shields 601 and 603.

The magnetic short is provided between the shields 601 and 603 in a position outside the loop enclosed by the leads 607 and 609 and the MR element 605. In order to place the magnetic short closer to the MR element 605, the size of the leads 607 and 609 may be reduced, thereby reducing the effective loop of conductive material. However, reducing the amount of shielding enclosed by the size of the leads 607 and 609 also reduces the signal efficiency of the MR head output. Thus, a trade-off is made between achieving a reduction in interference by providing a lower reluctance path outside the loop and providing sufficiently low lead resistance for proper signal efficiency.

Figure 7:
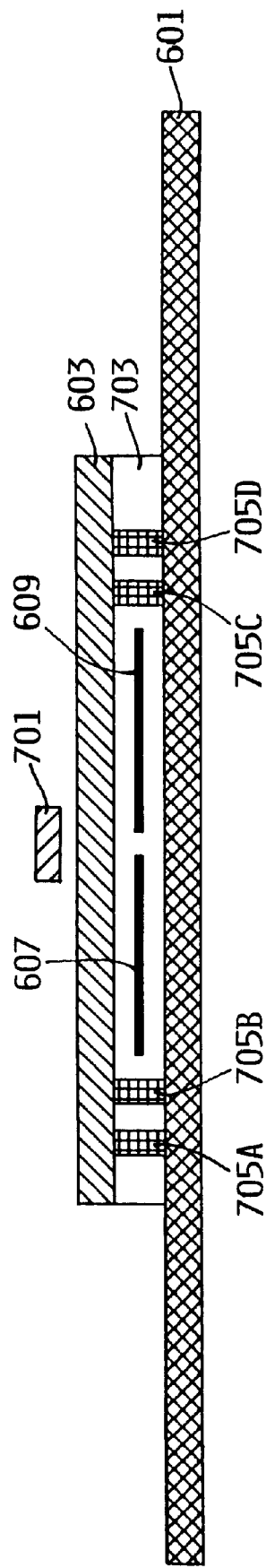
FIG. 7 illustrates a bottom cross-sectional view of an exemplary embodiment taken along lines 7—7 of FIG. 6.

FIG. 7 represents a bottom cross-sectional view of an exemplary embodiment taken along lines 7—7 of FIG. 6. The elements in FIG. 7 are not drawn to scale, but rather are provided to produce an enhanced view of the relational aspects of the invention. In FIG. 7, an insulation layer 703, such as glass, is provided between the first shield 601 and the second shield 603. The insulation layer 703 surrounds the leads 607 and 609. The second pole 701 of the write element is also depicted.

Via holes 611 are formed through the insulation layer 703 and are filled with a magnetic conductive material 705A, 705B, 705C and 705D, which provide a low reluctance path between the first shield 601 and the second shield 603. In this manner, a low reluctance flux path is provided between the first and second shields 601 and 603.

Figure 8:
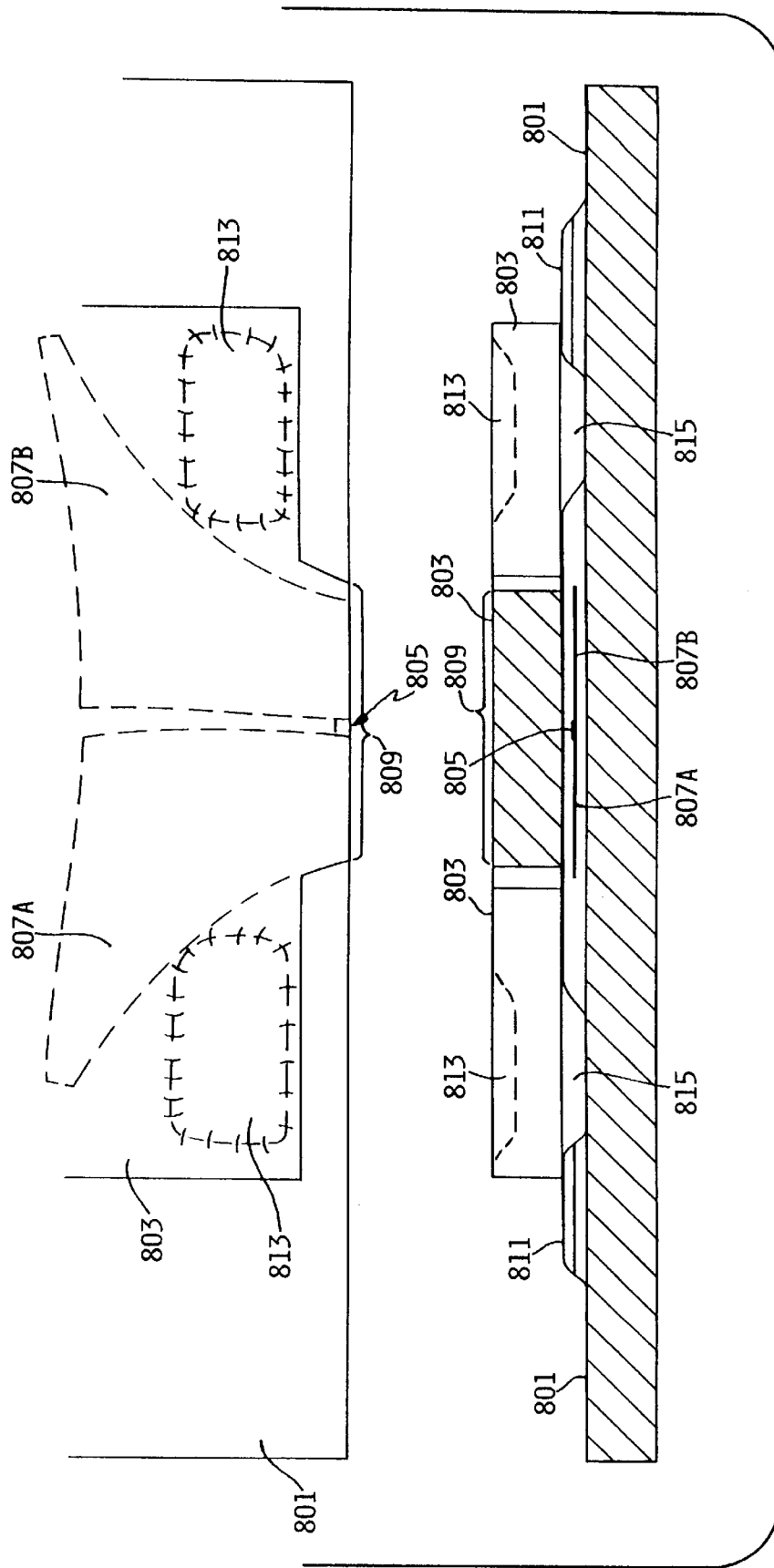
FIG. 8 illustrates another MR head in accordance with an embodiment of the invention.

In FIG. 8, side and bottom views of a magnetic head in accordance with another embodiment of the present invention are illustrated. The head includes a first shield 801 and a second shield 803. The MR element 805 is coupled to leads 807A and 807B which are coupled to a preamplifier module (not shown) in a manner similar to that illustrated in FIG. 4. The portion 809 of the second shield 803 extends down toward the disk surface and forms the effective width for the inductive pick-up by the shields 801 and 803. A magnetic insulation layer 811, such as glass, is formed between the shields 801 and 803 and insulates the MR element 805 and the leads 807A and 807B from the shields 801 and 803.

A recessed region 813 of the second shield 803 corresponds to a hole formed in the insulation layer 811 prior to formation of the second shield 803. In this manner, the portion 815 of the second shield 803 connects to the first shield 801 to from a low reluctance path between the two shields 801 and 803 which is outside the loop of conductive material.

Figure 9:
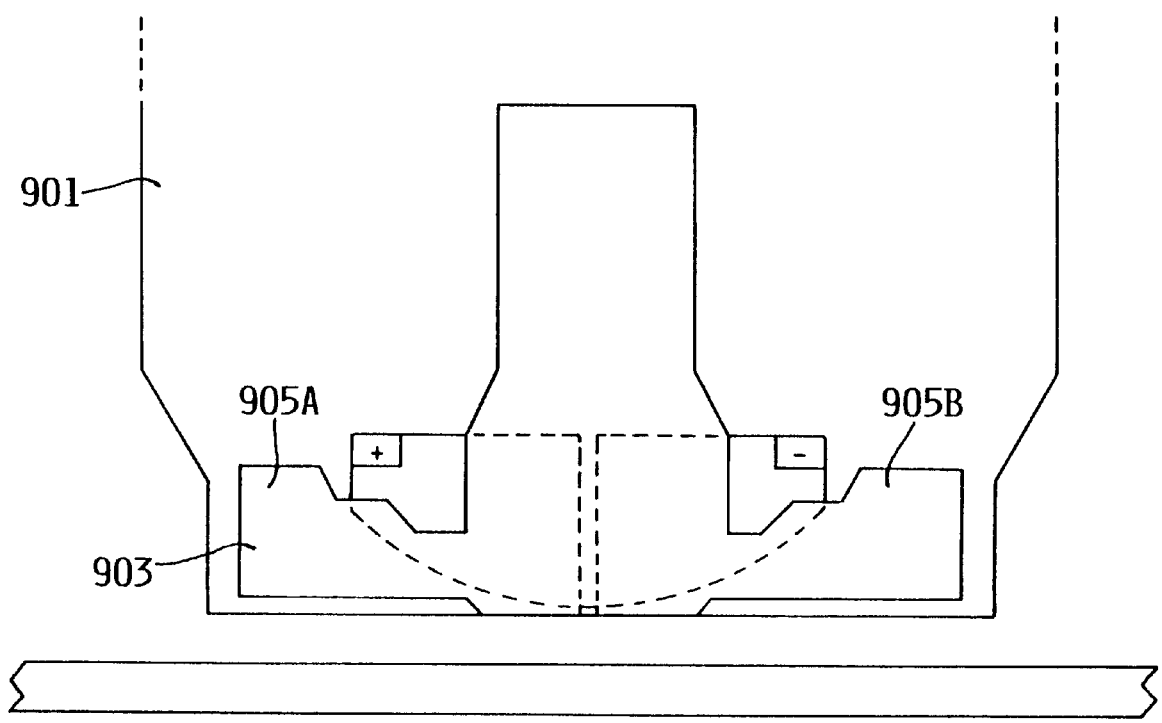
FIG. 9 illustrates still another embodiment of the invention.

In the previous embodiment, the low reluctance path is formed by directly shorting the shields together. However, direct shorting of the two shields is not necessarily required. Any relatively low reluctance path which lies outside the loop of conductive material may be exploited to reduce the inductive interference in the signal picked up by the MR element. FIG. 9 illustrates an alternative embodiment of an MR head having a low reluctance path. In FIG. 9, the second shield 903 includes portions (e.g., shunts) 905A and 905B which extend outwardly beyond the conductive material loop. These portions allow the flux picked up by the shields 901 and 903 to pass between the shields as a result of magnetic flux flowing through the gap at the location of the outwardly extending portions 905A and 905B. As the relative area of the portions of shield 903 located outside of the conductive loop is increased, a larger percentage of the flux picked up by the shields 901 and 903 will be conducted from one shield to the other through a relatively low reluctance path provided outside of the conductive loop. Thus, the overall interference is reduced.

As illustrated above, a reluctance path may be incorporated in the shield structure of an MR head to significantly reduce the interference phenomenon associated with the use of conventional MR heads. The various embodiments described above are provided by way of illustration only and should not be construed to limit the invention. Other mechanisms for reducing the amount of interference associated with the inductive read head of the MR head shielding will be readily apparent upon review of the above disclosure. Those skilled in the art will readily recognize various modifications and changes which may be made to the present invention without strictly following the exemplary embodiments and applications illustrated and described herein, and without departing from the true spirit and scope of the present invention which is set forth in the following claims.

What is claimed is:

1. A transducer for reading information from a medium, comprising:
   a first shield;
   a second shield having a narrow elongated portion with a first width extending downwardly toward the medium;
   a magneto-resistive (MR) element disposed in a gap between the first shield and the second shield and being respectively connected to first and second leads, the MR element and the first and second leads forming an effective loop of conductive material; and
   a low reluctance flux path coupling the first shield to the second shield and disposed of the effective loop;
   the second shield comprises a reduced-width portion with a second width that is reduced to decrease flux pickup by the first and second shields and a first and second side portions with a combined width extending and expanding outwardly from the narrow elongated portion, the combined width of the first and second side portions is wider than the first width and the second width near the medium, and the first and second side portions extending and expanding outwardly beyond the effective loop to increase the flow of the flux pickup between the first and second shields at the first and second side portions.

2. A transducer as recited in claim 1, further comprising an electrical insulation layer disposed within the gap between the first and the second shields and including a plurality of via holes filled with a magnetically conductive material to form the low reluctance flux path between the first and the second shield.

3. A transducer as recited in claim 2, wherein the magnetically conductive material formed in the via holes includes a part of the second shield.

4. A transducer as recited in claim 1, further comprising:
   an electrical insulation layer disposed within the gap between the first and the second shields and substantially surrounding the first lead, the second lead and the MR element; and
   a plurality of via holes disposed in the electrical insulation layer a distance away from the first lead and the second lead, the via holes being filled with a magnetically conductive material to form the low reluctance path between the first and the second shield.

5. A transducer as recited in claim 1, wherein of the second side portion of the second shield which extends outside of the effective loop provides the low reluctance flux path.

6. A memory storage device, comprising:
   a disk for storing information;
   a transducer positioned in transducing relation with respect to the disk, said transducer including,
   a first shield;
   a second shield having a narrow elongated portion with a first width extending downwardly toward the disk;
   a magneto-resistive (MR) element disposed in a gap between the first and the second shields and being respectively connected to first and second leads, the MR element and the first and second leads, the MR element and the first and second leads forming an effective loop of conductive material, and
   a low reluctance flux path coupling the first shield to the second shield at a portion of the first shield and the second shield outside of the effective loop; and
   an actuator to which the transducer is mounted to provide a relative movement to position the transducer adjacent of the disk;
   wherein the second shield includes a reduced-width portion with a second which that is reduced to decrease flux pickup by the first and second shields and a first and second side portions with a combined width extending and expanding outwardly from the narrow elongated portion, the combined width of the first and second side portions i.e. wider than the first width and the second width near the medium, and the first and side portions extending and expanding outwardly beyond the effective loop to increase the flow of the flux pickup between the first and second shields at the first and second side portions.

7. A device as recited in claim 6, wherein the disk includes a plurality of servo patterns extending outwardly in a generally radial direction with respect to a center of the disk and extending over a plurality of circumferential information tracks disposed on said disk, said servo patterns being formed of phase aligned transitions.

8. A device as recited in claim 6, wherein the transducer further comprises an electrical insulation layer disposed within the gap between the first and the second shields and having a plurality of via holes filled with a magnetically conductive material to form the low reluctance flux path between the first and the second shields.

9. A device as recited in claim 8, wherein the magnetically conductive material formed in the via holes include a part of the second shield.

10. A device as recited in claim 6, wherein the transducer further comprises:
    an electrical insulation layer disposed with in the gap between the first and the second shields and substantially surrounding the first lead, the second lead and the MR element; and
    a plurality of via holes disposed in the electrical insulation layer a distance away from the first lead and the second lead, the via holes being filled with a magnetically conductive material to form the low reluctance flux path between the first and the second shields.

11. A device as recited in claim 6, wherein the second side portion of the second shield which extends outside of the effective loop to provide the low reluctance flux path.

12. A method of reducing inductive signal pickup in a transducer including a magneto-resistive (MR) element disposed in a gap between first and second shields for detecting recorded signals on a medium, the MR element being respectively connected to first and second leads, the MR element and the first and second leads forming an effective loop of conductive material, the method comprising the steps of:
    providing a first shield;
    providing a second shield having a narrow elongated portion with a first width extending downwardly toward the medium, and the second shield having a reduced-width portion with a second width that is reduced to decrease flux pickup by the first and second shields and a first and second side portions with a combined width extending and expanding outwardly from the narrow elongated portion, the combined width of the first and second side portions is wider than the first width and the second width near the medium, and the first and second side portions extending and expanding outwardly beyond the effective loop to increase the flow of the flux pickup between the first and second shields at the first and second side portions; and providing a low reluctance flux path between the first and second shields outside of the effective loop of conductive material.

13. A method as recited in claim 12, wherein comprises the step of providing a magnetically conductive path between the portion of the first and second shields to form a magnetic short between the first and second shields.

14. A memory storage device, comprising:
   a storage medium for storing information; and
   a transducer positioned to provide relative movement between the transducer and the storage medium, said transducer including,
   a first shield,
   a second shield, having a narrow elongated portion with a first width extending downwardly toward the medium;
   a magneto-resistive (MR) element disposed in a gap between the first and the second shields and being respectively connected to first and second leads, the MR element and the first and second leads forming an effective loop of conductive material, and
   a low reluctance flux path coupling the first shield to the second shield at a portion of the first shield and the second shield outside of the effective loop;
   the second shield includes a reduced-width portion with a second width that is reduced to decrease flux pickup by the first and second shields and a first and second side portions with a combined width extending and expanding outwardly from the narrow elongated portion, the combined width of the first and second side portions is wider than the first width and the second width near the medium, and the first and second side portions extending and expanding outwardly beyond the effective loop to increase the flow of the flux pickup between the first and second shields at the first and second side portions.

* * * * *

UNITED STATES PATENT AND TRADEMARK OFFICE
CERTIFICATE OF CORRECTION

PATENT NO. : 5,923,502
DATED : Jul. 13, 1999
INVENTOR(S) : Thomas Charles Christensen, Jodie Ann Christner, Earl Albert Cunningham, Jay Michael Mosbrucker It is certified that error appears in the above-identified patent and that said Letters Patent is hereby corrected as shown below:

In the Claims:

Claim 1, Col. 7, line 26; "comprises" should be --includes--.

Claim 5, Col. 7, line 57; delete "of".

Claim 5, Col. 7, line 59; "provides" should be --to provide--.

Claim 6, Col. 8, line 13; delete "wherein"

Claim 6, Col. 8, line 14; "which" should be --width--

Claim 6, Col. 8, line 19; "i.e." should be --is--.

Claim 10, Col. 8, line 43; "with in" should be --within--.

Claim 13, Col. 9, line 15; delete "comprises".

Claim 13, Col. 9, line 16; replace "step of providing" with --providing step comprises the step of providing--.

Claim 13, Col. 9, line 17; delete "the portion of".

Signed and Sealed this

Twenty-eighth Day of March, 2000

Attest:

Q. TODD DICKINSON

*Attesting Officer*  *Commissioner of Patents and Trademarks*